(12) United States Patent
Smith et al.

(10) Patent No.: US 11,117,477 B2
(45) Date of Patent: Sep. 14, 2021

(54) METHODS AND DEVICES FOR THERMAL CONTROL DURING CHARGING OF ELECTRIC VEHICLES

(71) Applicant: NIO USA, Inc., San Jose, CA (US)

(72) Inventors: Alexander J. Smith, Mountain View, CA (US); Rick Rajaie, Rochester Hills, MI (US)

(73) Assignee: NIO USA, Inc., San Jose, CA (US)

( * ) Notice: Subject to any disclaimer, the term of this patent is extended or adjusted under 35 U.S.C. 154(b) by 415 days.

(21) Appl. No.: 15/940,638

(22) Filed: Mar. 29, 2018

(65) Prior Publication Data

US 2019/0299790 A1    Oct. 3, 2019

(51) Int. Cl.
| | |
|---|---|
| *B60L 53/10* | (2019.01) |
| *H02J 7/00* | (2006.01) |
| *H01M 10/615* | (2014.01) |
| *H01M 10/65* | (2014.01) |

(52) U.S. Cl.
CPC ............ *B60L 53/11* (2019.02); *H01M 10/615* (2015.04); *H01M 10/65* (2015.04); *H02J 7/0027* (2013.01); *H02J 7/0091* (2013.01)

(58) Field of Classification Search
CPC ..... B60L 53/11; H02J 7/0027; H01M 10/617; H01M 10/625
See application file for complete search history.

(56) References Cited

U.S. PATENT DOCUMENTS

| | | |
|---|---|---|
| 5,594,315 A | 1/1997 | Ramos et al. |
| 5,684,380 A | 11/1997 | Woody et al. |
| 6,396,241 B1 | 5/2002 | Ramos et al. |
| 8,336,319 B2 | 12/2012 | Johnston et al. |
| 8,620,506 B2 | 12/2013 | Kummer et al. |
| 8,899,492 B2 | 12/2014 | Kelty et al. |
| 9,631,872 B2 | 4/2017 | Lombardo et al. |
| 9,707,823 B2 | 7/2017 | Feuerecker et al. |
| 9,758,012 B2 | 9/2017 | Johnston |
| 9,878,594 B2 | 1/2018 | Enomoto et al. |
| 10,183,548 B2 | 1/2019 | Enomoto et al. |
| 10,910,680 B2 * | 2/2021 | Fleming .............. H01M 10/443 |
| 2002/0094910 A1 | 7/2002 | Endo et al. |
| 2005/0142250 A1 | 6/2005 | Garwood |
| 2010/0089669 A1 | 4/2010 | Taguchi |
| 2011/0189524 A1 | 8/2011 | Alizon et al. |

(Continued)

OTHER PUBLICATIONS

U.S. Appl. No. 15/408,079, filed Jan. 17, 2017, Newman et al.

(Continued)

*Primary Examiner* — Richard V Muralidar
(74) *Attorney, Agent, or Firm* — Sheridan Ross P.C.

(57) ABSTRACT

A device for charging an energy storage device includes a controller to initiate a charging operation for the energy storage device and control, during a first stage of the charging operation, a thermal control system to direct a first volume of the thermal mass along a first flow path to heat the energy storage device to a first desired temperature. The controller controls, during a second stage of the charging operation, the thermal control system to direct a second volume of the thermal mass along a second flow path to cool the energy storage device from the first desired temperature towards a second desired temperature.

20 Claims, 10 Drawing Sheets

(56) References Cited

U.S. PATENT DOCUMENTS

| | | |
|---|---|---|
| 2011/0316486 A1* | 12/2011 | Inaba .................... H01M 10/48 |
| | | 320/150 |
| 2012/0003510 A1 | 1/2012 | Eisenhour |
| 2012/0009455 A1 | 1/2012 | Yoon |
| 2012/0037336 A1 | 2/2012 | Ishikawa et al. |
| 2012/0043943 A1 | 2/2012 | Dyer et al. |
| 2012/0241129 A1 | 9/2012 | Kohl et al. |
| 2012/0247753 A1 | 10/2012 | Bachmann |
| 2012/0316711 A1 | 12/2012 | Christian et al. |
| 2014/0012447 A1 | 1/2014 | Gao et al. |
| 2014/0096557 A1 | 4/2014 | Higashiiue |
| 2014/0099521 A1* | 4/2014 | Kim .......................... B60L 1/02 |
| | | 429/50 |
| 2014/0292260 A1 | 10/2014 | Dyer et al. |
| 2014/0370353 A1 | 12/2014 | Oshiba et al. |
| 2015/0054460 A1 | 2/2015 | Epstein et al. |
| 2015/0135742 A1 | 5/2015 | Rousseau et al. |
| 2015/0217622 A1 | 8/2015 | Enomoto et al. |
| 2015/0273976 A1 | 10/2015 | Enomoto et al. |
| 2015/0306974 A1 | 10/2015 | Mardall et al. |
| 2016/0013510 A1 | 1/2016 | Powell |
| 2016/0107507 A1 | 4/2016 | Johnston |
| 2016/0226111 A1 | 8/2016 | Blume et al. |
| 2016/0318370 A1 | 11/2016 | Rawlinson |
| 2017/0015397 A1 | 1/2017 | Mitchell et al. |
| 2017/0110775 A1* | 4/2017 | Smith .................. H01M 10/625 |
| 2017/0214099 A1* | 7/2017 | Fleming ............ H01M 10/6556 |
| 2018/0034122 A1 | 2/2018 | Newman |
| 2018/0048037 A1 | 2/2018 | Newman |
| 2018/0048039 A1 | 2/2018 | Newman et al. |
| 2019/0176572 A1 | 6/2019 | Kim |

OTHER PUBLICATIONS

U.S. Appl. No. 15/686,513, filed Aug. 25, 2017, Smith et al.
Official Action for U.S. Appl. No. 15/408,079, dated Jun. 4, 2018, 6 pages, Restriction Requirement.
Official Action for U.S. Appl. No. 15/408,079, dated Sep. 20, 2018, 12 pages.
Official Action for U.S. Appl. No. 15/364,891, dated Oct. 19, 2018, 6 pages, Restriction Requirement.
Final Action for U.S. Appl. No. 15/3364,891, dated Jun. 28, 2019, 15 pages.
Official Action for U.S. Appl. No. 15/686,513, dated Aug. 19, 2019, 10 pages.
Official Action for U.S. Appl. No. 15/3364,891, dated Mar. 23, 2020, 16 pages.
Final Action for U.S. Appl. No. 15/686,513, dated Feb. 7, 2020, 11 pages.
Official Action for U.S. Appl. No. 15/983,289, dated Jan. 27, 2020, 18 pages.
U.S. Appl. No. 15/983,289, filed May 18, 2018, Rajaie et al.
Final Action for U.S. Appl. No. 15/408,079, dated Mar. 19, 2019, 7 pages.
Official Action for U.S. Appl. No. 15/364,891, dated Jan. 8, 2019, 14 pages.
Final Action for U.S. Appl. No. 15/364,891, dated May 1, 2020, 32 pages.
Official Action for U.S. Appl. No. 15/686,513, dated May 26, 2020, 17 pages.
Official Action for U.S. Appl. No. 15/983,289, dated Aug. 21, 2020, 20 pages.

* cited by examiner

METHODS AND DEVICES FOR THERMAL CONTROL DURING CHARGING OF ELECTRIC VEHICLES

FIELD

The present disclosure is generally directed to methods and devices for charging batteries, for example, batteries of electric vehicles.

BACKGROUND

Fast charging operations are desired for many battery-powered systems. One such system relates to fast charging for electric vehicles. As the field continues to develop, procedures are desired to control charging in a manner that quickly charges the battery while mitigating the potential of damage to the battery during charging operations.

DETAILED DESCRIPTION

Embodiments of the present disclosure will be described in connection with a vehicle, and more particularly with respect to an automobile. However, for the avoidance of doubt, the present disclosure encompasses the use of the aspects described herein in vehicles other than automobiles.

Conventional practice during fast charging of batteries is to regulate the temperature as much as possible so the batteries do not get too hot (e.g., exceed predetermined acceptable temperature threshold values, etc.), which may cause the batteries to degrade faster. During fast charge events, it is may be beneficial to increase the temperature of the batteries (pre-conditioning) to a certain point in order to avoid lithium plating of the battery cells. Additionally, this strategy allows the thermal system to load shift the compressor capability and build up a large cooling capacity, then re-direct the coolant into the battery during fast charge to control the battery temperature within safe operating limits.

In some embodiments, the present disclosure provides a thermal control strategy that includes multiple stages. For instance, Stage 1 may include the following sequence of operations:

Trigger: Start Charging

Thermal Loop 1: Operates a chiller and pump to cool the fluid at maximum capacity and is thermally isolated from the battery Thermal Loop 2: Operates a heater and pump to heat the fluid at its maximum capacity and is coupled to the battery system to increase its temperature rapidly Battery Charging: Started at this stage and may be regulated based on any one of many control factors such as voltage, temperature, current, lithium plating limits, or SOC Stage 2 may include the following sequence of operations:

Trigger: Critical Temperature Reached

Thermal Loop 1: A control valve re-directs the super chilled fluid to the battery loop. The "hot fluid" is then pumped out to a thermally isolated loop from the battery. The compressor, chiller, and pump continue to run at maximum capacity Thermal Loop 2: The heater is disabled and pumps stopped Battery Charging: Fast charging continues and may be regulated based on any one of many control factors such as voltage, temperature, current, lithium plating limits, or SOC Stage 3 may include the following sequence of operations:

Trigger: Charge Complete

Thermal Loop 1: Continues to operate the compressor, chiller, and pump to cool down the battery to the desired temperature Thermal Loop 2: Off Battery Charging: Off It is an aspect of the present disclosure, that the above strategy may be employed to increase battery life, increase the fast charge rate by heating the cells to get them out of lithium plating, decrease charge time by allowing higher charge rates sooner, and/or allow for downsizing compressor/chiller components by load shifting a thermal mass.

Figure 1:
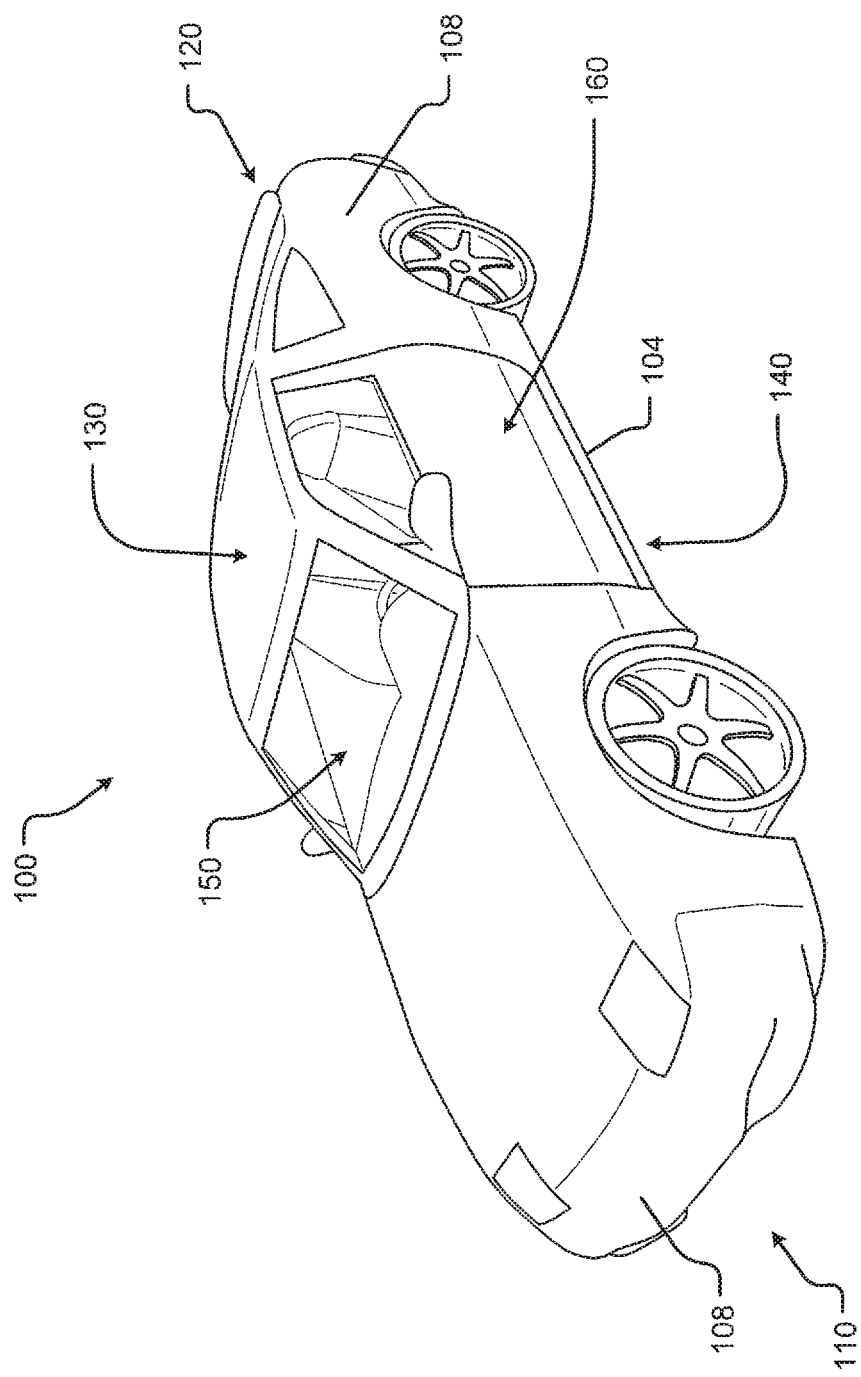
FIG. 1 shows a perspective view of a vehicle in accordance with at least one example embodiment.

FIG. 1 shows a perspective view of a vehicle 100 in accordance with at least one example embodiment. The electric vehicle 100 comprises a vehicle front 110, vehicle aft 120, vehicle roof 130, at least one vehicle side 160, a vehicle undercarriage 140, and a vehicle interior 150. The vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

Figure 2:
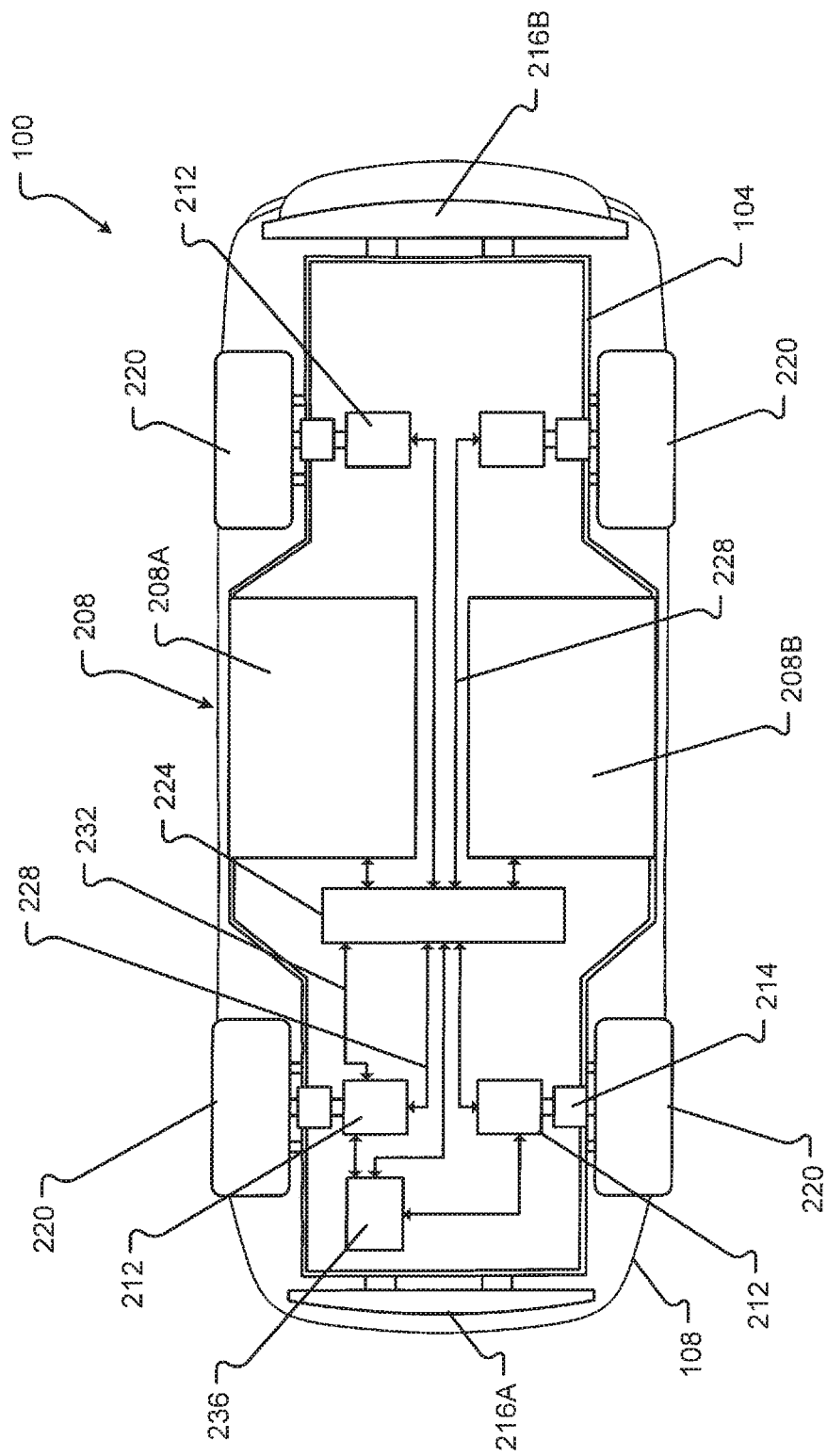
FIG. 2 shows a plan view of a vehicle in accordance with at least one example embodiment.

Referring now to FIG. 2, a plan view of a vehicle 100 will be described in accordance with at least one example embodiment. As provided above, the vehicle 100 may comprise a number of electrical and/or mechanical systems, subsystems, etc. The mechanical systems of the vehicle 100 can include structural, power, safety, and communications subsystems, to name a few. While each subsystem may be described separately, it should be appreciated that the components of a particular subsystem may be shared between one or more other subsystems of the vehicle 100.

The structural subsystem includes the frame 104 of the vehicle 100. The frame 104 may comprise a separate frame and body construction (i.e., body-on-frame construction), a unitary frame and body construction (i.e., a unibody construction), or any other construction defining the structure of the vehicle 100. The frame 104 may be made from one or more materials including, but in no way limited to steel, titanium, aluminum, carbon fiber, plastic, polymers, etc., and/or combinations thereof. In some embodiments, the frame 104 may be formed, welded, fused, fastened, pressed, etc., combinations thereof, or otherwise shaped to define a physical structure and strength of the vehicle 100. In any event, the frame 104 may comprise one or more surfaces, connections, protrusions, cavities, mounting points, tabs, slots, or other features that are configured to receive other components that make up the vehicle 100. For example, the body panels 108, powertrain subsystem, controls systems, interior components, communications subsystem, and safety subsystem may interconnect with, or attach to, the frame 104 of the vehicle 100.

The frame 104 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allow the vehicle 100 to adapt to the ever-changing technological demands of society and advances in safety. Among other things, the mechanisms may provide for the quick exchange of batteries, capacitors, power sources (or energy storage devices) 208A, 208B, motors 212, engines, safety equipment, controllers, user interfaces, interiors exterior components, body panels 108, bumpers 216, sensors, etc., and/or combinations thereof. Additionally or alternatively, the mechanisms may provide unique security hardware and/or software embedded therein that, among other things, can prevent fraudulent or low quality construction replacements from being used in the vehicle 100. Similarly, the mechanisms, subsystems, and/or receiving features in the vehicle 100 may employ poka-yoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single-minute exchange ("SME") principle. In some embodiments, the frame 104 may include slides, receptacles, cavities, protrusions, and/or a number of other features that allow for quick exchange of system components. In one embodiment, the frame 104 may include tray or ledge features, mechanical interconnection features, locking mechanisms, retaining mechanisms, etc., and/or combinations thereof. In some embodiments, it may be beneficial to quickly remove a used power source 208A, 208B (e.g., battery unit, capacitor unit, etc.) from the vehicle 100 and replace the used power source 208A, 208B with a charged or new power source. Continuing this example, the power source 208A, 208B may include selectively interchangeable features that interconnect with the frame 104 or other portion of the vehicle 100. For instance, in a power source 208A, 208B replacement, the quick release features may be configured to release the power source 208A, 208B from an engaged position and slide or move in a direction away from the frame 104 of a vehicle 100. Once removed, or separated from, the vehicle, the power source 208A, 208B may be replaced (e.g., with a new power source, a charged power source, etc.) by engaging the replacement power source into a system receiving position adjacent to the vehicle 100. In some embodiments, the vehicle 100 may include one or more actuators configured to position, lift, slide, or otherwise engage the replacement power source with the vehicle 100. In one embodiment, the replacement power source may be inserted into the vehicle 100 or vehicle frame 104 with mechanisms and/or machines that are external and/or separate from the vehicle 100.

In some embodiments, the frame 104 may include one or more features configured to selectively interconnect with other vehicles and/or portions of vehicles. These selectively interconnecting features can allow for one or more vehicles to selectively couple together and decouple for a variety of purposes. For example, it is an aspect of the present disclosure that a number of vehicles may be selectively coupled together to share energy, increase power output, provide security, decrease power consumption, provide towing services, and/or provide a range of other benefits. Continuing this example, the vehicles may be coupled together based on travel route, destination, preferences, settings, sensor information, and/or some other data. The coupling may be initiated by at least one controller of the vehicle and/or traffic control system upon determining that a coupling is beneficial to one or more vehicles in a group of vehicles or a traffic system. As can be appreciated, the power consumption for a group of vehicles traveling in a same direction may be reduced or decreased by removing any aerodynamic separation between vehicles. In this case, the vehicles may be coupled together to subject only the foremost vehicle in the coupling to air and/or wind resistance during travel. In one embodiment, the power output by the group of vehicles may be proportionally or selectively controlled to provide a specific output from each of the one or more of the vehicles in the group.

The interconnecting, or coupling, features may be configured as electromagnetic mechanisms, mechanical couplings, electromechanical coupling mechanisms, etc., and/or combinations thereof. The features may be selectively deployed from a portion of the frame 104 and/or body of the vehicle 100. In some cases, the features may be built into the frame 104 and/or body of the vehicle 100. In any event, the features may deploy from an unexposed position to an exposed position or may be configured to selectively engage/disengage without requiring an exposure or deployment of the mechanism from the frame 104 and/or body of the vehicle 100. In some embodiments, the interconnecting features may be configured to interconnect one or more of power, communications, electrical energy, fuel, and/or the like. One or more of the power, mechanical, and/or communications connections between vehicles may be part of a single interconnection mechanism. In some embodiments, the interconnection mechanism may include multiple connection mechanisms. In any event, the single interconnection mechanism or the interconnection mechanism may employ the poka-yoke features as described above.

The power system of the vehicle 100 may include the powertrain, power distribution system, accessory power system, and/or any other components that store power, provide power, convert power, and/or distribute power to one or more portions of the vehicle 100. The powertrain may include the one or more electric motors 212 of the vehicle 100. The electric motors 212 are configured to convert electrical energy provided by a power source into mechanical energy. This mechanical energy may be in the form of a rotational or other output force that is configured to propel or otherwise provide a motive force for the vehicle 100.

In some embodiments, the vehicle 100 may include one or more drive wheels 220 that are driven by the one or more electric motors 212 and motor controllers 214. In some cases, the vehicle 100 may include an electric motor 212 configured to provide a driving force for each drive wheel 220. In other cases, a single electric motor 212 may be configured to share an output force between two or more drive wheels 220 via one or more power transmission components. It is an aspect of the present disclosure that the powertrain may include one or more power transmission components, motor controllers 214, and/or power controllers that can provide a controlled output of power to one or more of the drive wheels 220 of the vehicle 100. The power transmission components, power controllers, or motor controllers 214 may be controlled by at least one other vehicle controller or computer system as described herein.

As provided above, the powertrain of the vehicle 100 may include one or more power sources 208A, 208B. These one or more power sources 208A, 208B may be configured to provide drive power, system and/or subsystem power, accessory power, etc. While described herein as a single power source 208 for sake of clarity, embodiments of the present disclosure are not so limited. For example, it should be appreciated that independent, different, or separate power sources 208A, 208B may provide power to various systems of the vehicle 100. For instance, a drive power source may be configured to provide the power for the one or more electric motors 212 of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 208A, 208B in this manner may provide a number of benefits over conventional vehicle systems. For example, separating the power sources 208A, 208B allow one power source 208 to be removed and/or replaced independently without requiring that power be removed from all systems and/or subsystems of the vehicle 100 during a power source 208 removal/replacement. For instance, one or more of the accessories, communications, safety equipment, and/or backup power systems, etc., may be maintained even when a particular power source 208A, 208B is depleted, removed, or becomes otherwise inoperable.

In some embodiments, the drive power source may be separated into two or more cells, units, sources, and/or systems. By way of example, a vehicle 100 may include a first drive power source 208A and a second drive power source 208B. The first drive power source 208A may be operated independently from or in conjunction with the second drive power source 208B and vice versa. Continuing this example, the first drive power source 208A may be removed from a vehicle while a second drive power source 208B can be maintained in the vehicle 100 to provide drive power. This approach allows the vehicle 100 to significantly reduce weight (e.g., of the first drive power source 208A, etc.) and improve power consumption, even if only for a temporary period of time. In some cases, a vehicle 100 running low on power may automatically determine that pulling over to a rest area, emergency lane, and removing, or "dropping off," at least one power source 208A, 208B may reduce enough weight of the vehicle 100 to allow the vehicle 100 to navigate to the closest power source replacement and/or charging area. In some embodiments, the removed, or "dropped off," power source 208A may be collected by a collection service, vehicle mechanic, tow truck, or even another vehicle or individual.

The power source 208 may include a GPS or other geographical location system that may be configured to emit a location signal to one or more receiving entities. For instance, the signal may be broadcast or targeted to a specific receiving party. Additionally or alternatively, the power source 208 may include a unique identifier that may be used to associate the power source 208 with a particular vehicle 100 or vehicle user. This unique identifier may allow an efficient recovery of the power source 208 dropped off. In some embodiments, the unique identifier may provide information for the particular vehicle 100 or vehicle user to be billed or charged with a cost of recovery for the power source 208.

The power source 208 may include a charge controller 224 that may be configured to determine charge levels of the power source 208, control a rate at which charge is drawn from the power source 208, control a rate at which charge is added to the power source 208, and/or monitor a health of the power source 208 (e.g., one or more cells, portions, etc.). In some embodiments, the charge controller 224 or the power source 208 may include a communication interface. The communication interface can allow the charge controller 224 to report a state of the power source 208 to one or more other controllers of the vehicle 100 or even communicate with a communication device separate and/or apart from the vehicle 100. Additionally or alternatively, the communication interface may be configured to receive instructions (e.g., control instructions, charge instructions, communication instructions, etc.) from one or more other controllers or computers of the vehicle 100 or a communication device that is separate and/or apart from the vehicle 100. Functions of the controller 224 are discussed in more detail below with respect to FIGS. 5-10.

The powertrain includes one or more power distribution systems configured to transmit power from the power source 208 to one or more electric motors 212 in the vehicle 100. The power distribution system may include electrical interconnections 228 in the form of cables, wires, traces, wireless power transmission systems, etc., and/or combinations thereof. It is an aspect of the present disclosure that the vehicle 100 include one or more redundant electrical interconnections 232 of the power distribution system. The redundant electrical interconnections 232 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection 232 is being used and/or damage has occurred to a particular area of the vehicle electrical system. In any event, the one or more redundant electrical interconnections 232 may be configured along completely different routes than the electrical interconnections 228 and/or include different modes of failure than the electrical interconnections 228 to, among other things, prevent a total interruption power distribution in the event of a failure.

In some embodiments, the power distribution system may include an energy recovery system 236. This energy recovery system 236, or kinetic energy recovery system, may be configured to recover energy produced by the movement of a vehicle 100. The recovered energy may be stored as electrical and/or mechanical energy. For instance, as a vehicle 100 travels or moves, a certain amount of energy is required to accelerate, maintain a speed, stop, or slow the vehicle 100. In any event, a moving vehicle has a certain amount of kinetic energy. When brakes are applied in a typical moving vehicle, most of the kinetic energy of the vehicle is lost as the generation of heat in the braking mechanism. In an energy recovery system 236, when a vehicle 100 brakes, at least a portion of the kinetic energy is converted into electrical and/or mechanical energy for storage. Mechanical energy may be stored as mechanical movement (e.g., in a flywheel, etc.) and electrical energy may be stored in batteries, capacitors, and/or some other electrical storage system. In some embodiments, electrical energy recovered may be stored in the power source 208. For example, the recovered electrical energy may be used to charge the power source 208 of the vehicle 100.

The vehicle 100 may include one or more safety systems. Vehicle safety systems can include a variety of mechanical and/or electrical components including, but in no way limited to, low impact or energy-absorbing bumpers 216A, 216B, crumple zones, reinforced body panels, reinforced frame components, impact bars, power source containment zones, safety glass, seatbelts, supplemental restraint systems, air bags, escape hatches, removable access panels, impact sensors, accelerometers, vision systems, radar systems, etc., and/or the like. In some embodiments, the one or more of the safety components may include a safety sensor or group of safety sensors associated with the one or more of the safety components. For example, a crumple zone may include one or more strain gages, impact sensors, pressure transducers, etc. These sensors may be configured to detect or determine whether a portion of the vehicle 100 has been subjected to a particular force, deformation, or other impact. Once detected, the information collected by the sensors may be transmitted or sent to one or more of a controller of the vehicle 100 (e.g., a safety controller, vehicle controller, etc.) or a communication device associated with the vehicle 100 (e.g., across a communication network, etc.).

Figure 3:
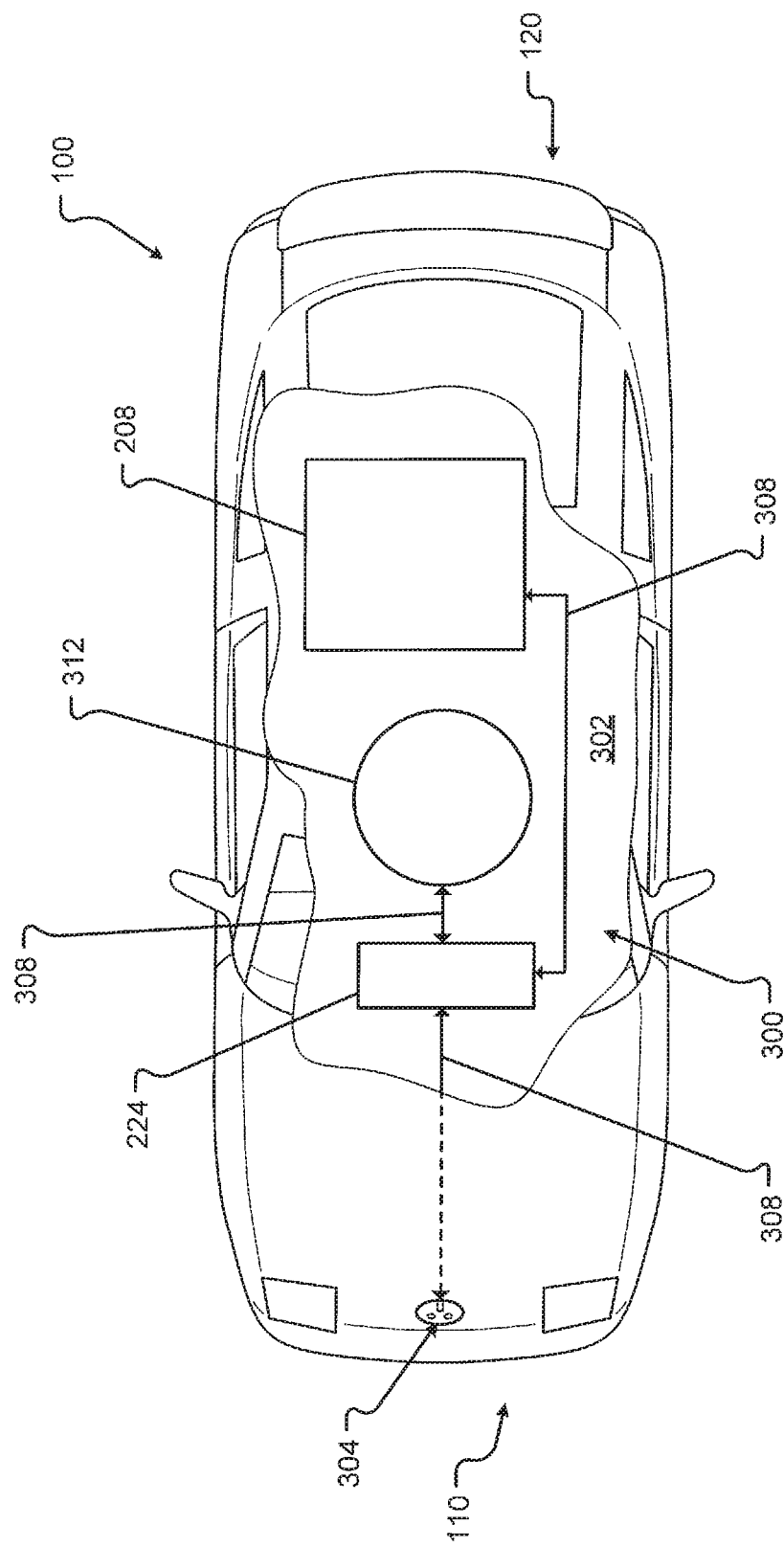
FIG. 3 shows a plan view of a vehicle in accordance with at least one example embodiment.

FIG. 3 shows a plan view of the vehicle 100 in accordance with at least one example embodiment. In particular, FIG. 3 shows a broken section 302 of a charging system 300 for the vehicle 100. The charging system 300 may include a plug or receptacle 304 configured to receive power from an external power source (e.g., a source of power that is external to and/or separate from the vehicle 100, etc.). An example of an external power source may include the standard industrial, commercial, or residential power that is provided across power lines. Another example of an external power source may include a proprietary power system configured to provide power to the vehicle 100. In any event, power received at the plug/receptacle 304 may be transferred via at least one power transmission interconnection 308. Similar, if not identical, to the electrical interconnections 228 described above, the at least one power transmission interconnection 308 may be one or more cables, wires, traces, wireless power transmission systems, etc., and/or combinations thereof. Electrical energy in the form of charge can be transferred from the external power source to the charge controller 224. As provided above, the charge controller 224 may regulate the addition of charge to at least one power source 208 of the vehicle 100 (e.g., until the at least one power source 208 is full or at a capacity, etc.).

In some embodiments, the vehicle 100 may include an inductive charging system and inductive charger 312. The inductive charger 312 may be configured to receive electrical energy from an inductive power source external to the vehicle 100. In one embodiment, when the vehicle 100 and/or the inductive charger 312 is positioned over an inductive power source external to the vehicle 100, electrical energy can be transferred from the inductive power source to the vehicle 100. For example, the inductive charger 312 may receive the charge and transfer the charge via at least one power transmission interconnection 308 to the charge controller 324 and/or the power source 208 of the vehicle 100. The inductive charger 312 may be concealed in a portion of the vehicle 100 (e.g., at least partially protected by the frame 104, one or more body panels 108, a shroud, a shield, a protective cover, etc., and/or combinations thereof) and/or may be deployed from the vehicle 100. In some embodiments, the inductive charger 312 may be configured to receive charge only when the inductive charger 312 is deployed from the vehicle 100. In other embodiments, the inductive charger 312 may be configured to receive charge while concealed in the portion of the vehicle 100.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.)

about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

Figure 4:
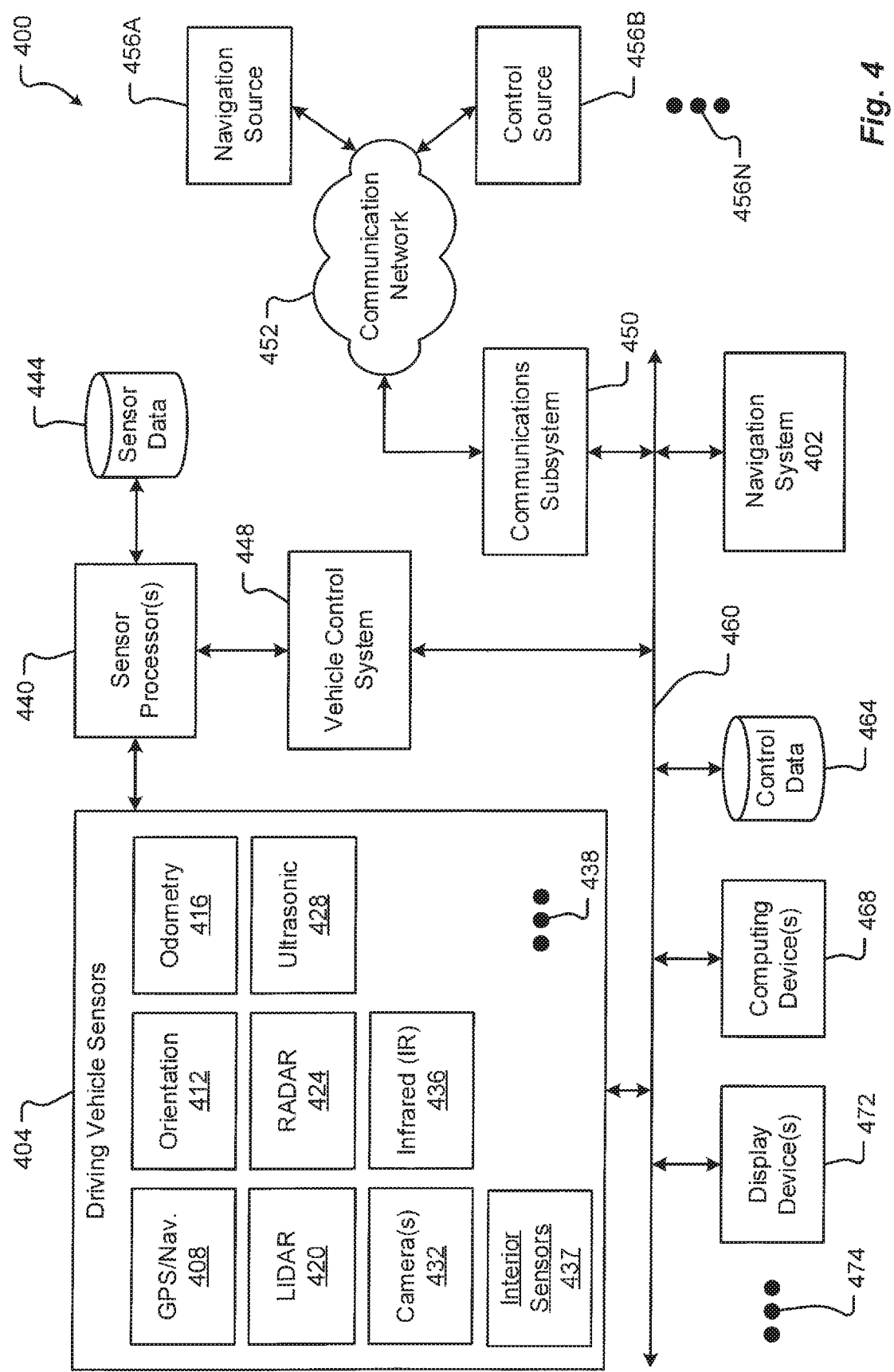
FIG. 4 is a block diagram of a communication environment of the vehicle in FIGS. 1-3 in accordance with at least one example embodiment.

FIG. 4 is a block diagram of an embodiment of a communication environment 400 of the vehicle 100 in accordance with at least one example embodiment. The communication system 400 may include one or more vehicle driving vehicle sensors and systems 404, sensor processors 440, sensor data memory 444, vehicle control system 448, communications subsystem 450, control data 464, computing devices 468, display devices 472, and other components 474 that may be associated with a vehicle 100. These associated components may be electrically and/or communicatively coupled to one another via at least one bus 460. In some embodiments, the one or more associated components may send and/or receive signals across a communication network 452 to at least one of a navigation source 456A, a control source 456B, or some other entity 456N.

In accordance with at least some embodiments of the present disclosure, the communication network 452 may comprise any type of known communication medium or collection of communication media and may use any type of protocols, such as SIP, TCP/IP, SNA, IPX, AppleTalk, and the like, to transport messages between endpoints. The communication network 452 may include wired and/or wireless communication technologies. The Internet is an example of the communication network 452 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 452 need not be limited to any one network type, and instead may be comprised of a number of different networks and/or network types. The communication network 452 may comprise a number of different communication media such as coaxial cable, copper cable/wire, fiber-optic cable, antennas for transmitting/receiving wireless messages, and combinations thereof.

The driving vehicle sensors and systems 404 may include at least one navigation 408 (e.g., global positioning system (GPS), etc.), orientation 412, odometry 416, LIDAR 420, RADAR 424, ultrasonic 428, camera 432, infrared (IR) 436, and/or other sensor or system 438.

The navigation sensor 408 may include one or more sensors having receivers and antennas that are configured to utilize a satellite-based navigation system including a network of navigation satellites capable of providing geolocation and time information to at least one component of the vehicle 100. Examples of the navigation sensor 408 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 412 may include one or more sensors configured to determine an orientation of the vehicle 100 relative to at least one reference point. In some embodiments, the orientation sensor 412 may include at least one pressure transducer, stress/strain gauge, accelerometer, gyroscope, and/or geomagnetic sensor. Examples of the navigation sensor 408 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, which may perform orientation detection and/or determination functions using any known or future-developed standard and/or architecture.

The odometry sensor and/or system 416 may include one or more components that is configured to determine a change in position of the vehicle 100 over time. In some embodiments, the odometry system 416 may utilize data from one or more other sensors and/or systems 404 in determining a position (e.g., distance, location, etc.) of the vehicle 100 relative to a previously measured position for the vehicle 100. Additionally or alternatively, the odometry sensors 416 may include one or more encoders, Hall speed sensors, and/or other measurement sensors/devices configured to measure a wheel speed, rotation, and/or number of revolutions made over time. Examples of the odometry sensor/system 416 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Magnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 420 may include one or more components configured to measure distances to targets using laser illumination. In some embodiments, the LIDAR sensor/system 420 may provide 3D imaging data of an environment around the vehicle 100. The imaging data may be processed to generate a full 360-degree view of the environment around the vehicle 100. The LIDAR sensor/system 420 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 420 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 420 may detect when light from the plurality of laser beams emitted into the measurement environment returns (e.g., reflected echo) to the LIDAR sensor/system 420. The LIDAR sensor/system 420 may calculate, based on a time associated with the emission of light to the detected return of light, a distance from the vehicle 100 to the illuminated target. In some embodiments, the LIDAR sensor/system 420 may generate over 2.0 million points per second and have an effective operational range of at least 100 meters. Examples of the LIDAR sensor/system 420 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 424 may include one or more radio components that are configured to detect objects/targets in an environment of the vehicle 100. In some embodiments, the RADAR sensors 424 may determine a distance, position, and/or movement vector (e.g., angle, speed, etc.) associated with a target over time. The RADAR sensors 424 may include a transmitter configured to generate and emit electromagnetic waves (e.g., radio, microwaves, etc.) and a receiver configured to detect returned electromagnetic waves. In some embodiments, the RADAR sensors 424 may include at least one processor configured to interpret the returned electromagnetic waves and determine locational properties of targets. Examples of the RADAR sensors 424 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 428 may include one or more components that are configured to detect objects/targets in an environment of the vehicle 100. In some embodiments, the ultrasonic sensors 428 may determine a distance, position, and/or movement vector (e.g., angle, speed, etc.) associated with a target over time. The ultrasonic sensors 428 may include an ultrasonic transmitter and receiver, or transceiver, configured to generate and emit ultrasound waves and interpret returned echoes of those waves. In some embodiments, the ultrasonic sensors 428 may include at least one processor configured to interpret the returned ultrasonic waves and determine locational properties of targets. Examples of the ultrasonic sensors 428 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 432 may include one or more components configured to detect image information associated with an environment of the vehicle 100. In some embodiments, the camera sensors 432 may include a lens, filter, image sensor, and/or a digital image processor. It is an aspect of the present disclosure that multiple camera sensors 432 may be used together to generate stereo images providing depth measurements. Examples of the camera sensors 432 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 436 may include one or more components configured to detect image information associated with an environment of the vehicle 100. The IR sensors 436 may be configured to detect targets in low-light, dark, or poorly-lit environments. The IR sensors 436 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 436 may include at least one processor configured to interpret the returned IR light and determine locational properties of targets. The IR sensors 436 may be configured to detect and/or measure a temperature associated with a target (e.g., an object, pedestrian, other vehicle, etc.). Examples of IR sensors 436 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

A navigation system 402 can include any hardware and/or software used to navigate the vehicle either manually or autonomously.

In some embodiments, the driving vehicle sensors and systems 404 may include other sensors 438 and/or combinations of the sensors 406-437 described above. Additionally or alternatively, one or more of the sensors 406-437 described above may include one or more processors configured to process and/or interpret signals detected by the one or more sensors 406-437. In some embodiments, the processing of at least some sensor information provided by the vehicle sensors and systems 404 may be processed by at least one sensor processor 440. Raw and/or processed sensor data may be stored in a sensor data memory 444 storage medium. In some embodiments, the sensor data memory 444 may store instructions used by the sensor processor 440 for processing sensor information provided by the sensors and systems 404. In any event, the sensor data memory 444 may be a disk drive, optical storage device, solid-state storage device such as a random-access memory ("RAM") and/or a read-only memory ("ROM"), which can be programmable, flash-updateable, and/or the like.

The vehicle control system 448 may receive processed sensor information from the sensor processor 440 and determine to control an aspect of the vehicle 100. Controlling an aspect of the vehicle 100 may include presenting information via one or more display devices 472 associated with the vehicle, sending commands to one or more computing devices 468 associated with the vehicle, and/or controlling a driving operation of the vehicle. In some embodiments, the vehicle control system 448 may correspond to one or more computing systems that control driving operations of the vehicle 100 in accordance with the Levels of driving autonomy described above. In one embodiment, the vehicle control system 448 may operate a speed of the vehicle 100 by controlling an output signal to the accelerator and/or braking system of the vehicle. In this example, the vehicle control system 448 may receive sensor data describing an environment surrounding the vehicle 100 and, based on the sensor data received, determine to adjust the acceleration, power output, and/or braking of the vehicle 100. The vehicle control system 448 may additionally control steering and/or other driving functions of the vehicle 100.

The vehicle control system 448 may communicate, in real-time, with the driving sensors and systems 404 forming a feedback loop. In particular, upon receiving sensor information describing a condition of targets in the environment surrounding the vehicle 100, the vehicle control system 448 may autonomously make changes to a driving operation of the vehicle 100. The vehicle control system 448 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 404, vehicle control system 448, display devices 472, etc.) may communicate across the communication network 452 to one or more entities 456A-N via a communications subsystem 450 of the vehicle 100. For instance, the navigation sensors 408 may receive global positioning, location, and/or navigational information from a navigation source 456A. In some embodiments, the navigation source 456A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 448 may receive control information from one or more control sources 456B. The control source 456 may provide vehicle control information including autonomous driving control commands, vehicle operation override control commands, and the like. The control source 456 may correspond to an autonomous vehicle control system, a traffic control system, an administrative control entity, and/or some other controlling server. It is an aspect of the present disclosure that the vehicle control system 448 and/or other components of the vehicle 100 may exchange communications with the control source 456 across the communication network 452 and via the communications subsystem 450.

Information associated with controlling driving operations of the vehicle 100 may be stored in a control data memory 464 storage medium. The control data memory 464 may store instructions used by the vehicle control system 448 for controlling driving operations of the vehicle 100, historical control information, autonomous driving control rules, and the like. In some embodiments, the control data memory 464 may be a disk drive, optical storage device, solid-state storage device such as a random-access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 5:
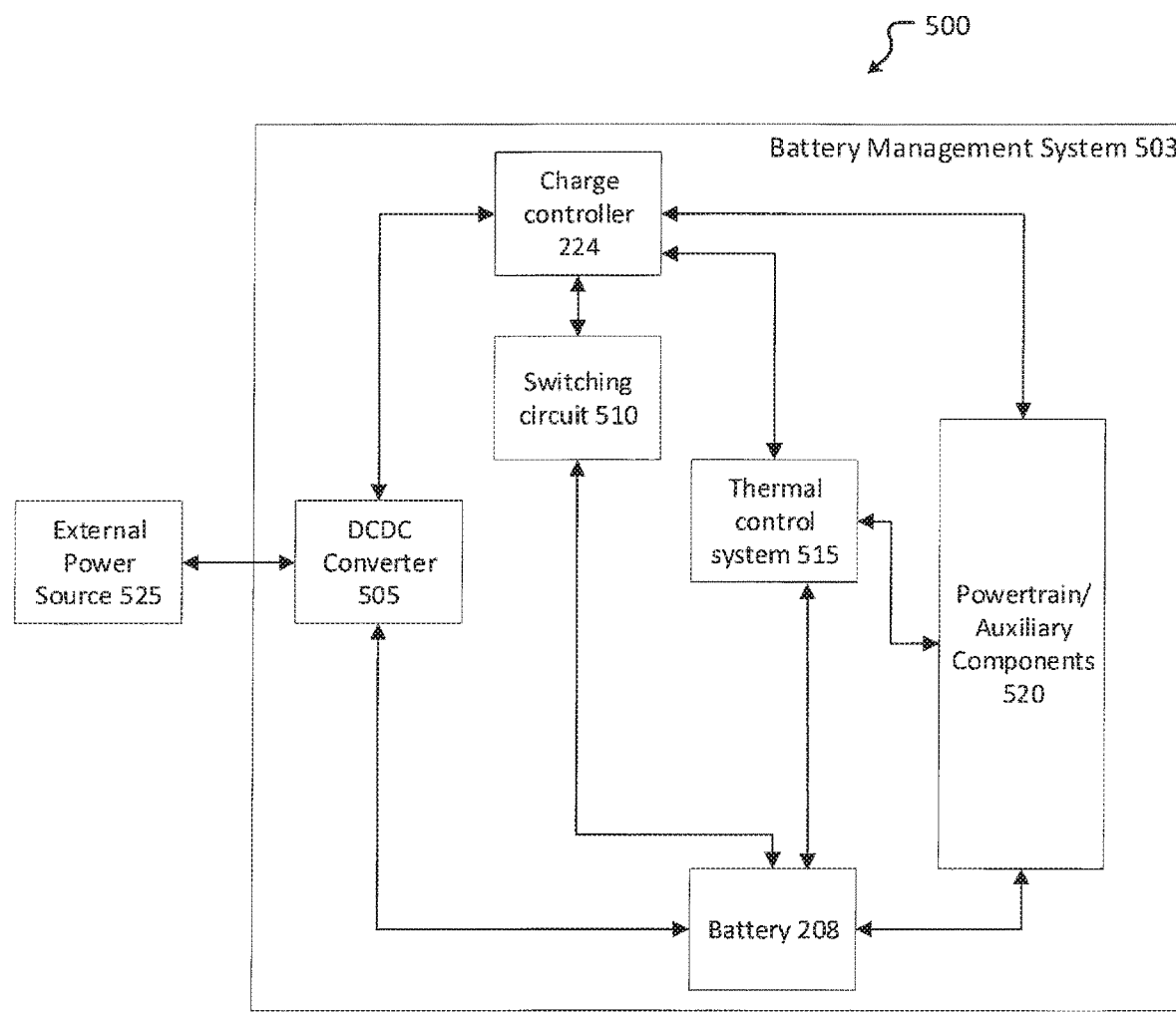
FIG. 5 illustrates a battery management system in accordance with at least one example embodiment.

FIG. 5 is an example schematic of a power system 500 for the vehicle 100 in accordance with at least one example embodiment. The power system 500 includes an external power source 525 and a Battery Management System (BMS) 503 that acts as a main power source to overall operation of electric motor(s) 212 and other components within the vehicle 100. The BMS 503 may be included in one or more of the elements in FIGS. 1-4 (e.g., in the vehicle control system 448) and/or as an element separate from the elements discussed with respect to FIGS. 1-4. The external power source 525 may be a charging station for the vehicle 100 or some other voltage source capable of charging the vehicle 100. The external power source 525 may have a first voltage, for example, 800V that is used for charging the battery 208. The battery 208 may have a nominal voltage that is less than the first voltage, for example, 400V.

As shown in FIG. 5, the BMS 503 includes the battery (or energy storage device) 208, the charge controller (or controller) 224, a voltage converter 505 (e.g., 10-20 kW), a switching circuit 510, a thermal control system 515, and powertrain and auxiliary components 520. The powertrain may include a desired number of inverters (e.g., two inverters) to drive corresponding electric motors 212 (e.g., two motors) to power the vehicle 100. The auxiliary components may include various loads other than the inverters/electric motors, such as various elements from FIGS. 1-4, other DCDC converters, compressors, panel instruments, etc.

The controller 224 controls operation of the BMS 503. The controller 224 may comprise software, hardware, or a combination thereof. For example, the controller 224 may include a memory including executable instructions and a processor (e.g., a microprocessor) that executes the instructions on the memory. Additionally or alternatively, the controller 224 may comprise hardware, such as an application specific integrated circuit (ASIC). The controller 224 is coupled to the powertrain/auxiliary components 520, the converter 505, the switching circuit 510, the thermal control system 515, and battery 208 (through the switching circuit 510). The controller 224 controls charging of the battery 208 during a charging operation. During the charging operation, the controller 224 controls the converter 505 to convert a first voltage (e.g., 800V) into a second voltage (e.g., 400V) to charge the battery 208.

The switching circuit 510 may include one or more switches that the controller 224 turns on and off to control electrical connections to the battery 208 during charging and/or driving operations. For example, in a driving mode of the vehicle 100, the controller 224 may control the switching circuit 510 such that the battery 208 provides power to the powertrain and auxiliary components 520 at a particular voltage (e.g., 400V). As another example, in a charging mode, the controller 224 may control the switching circuit 510 such that the battery 208 is connected to the external power source 525 to charge the battery 208 with the voltage (e.g., 800V) of the external power source 525. The number of switches and their configuration in the switching circuit 510 may be design parameters set based on empirical evidence and/or design preferences.

FIG. 5 illustrates a single battery 208. However, it should be further understood that the battery 208 may be one or more battery packs with a plurality of energy storage elements (e.g., individual battery cells).

The converter 505 may be a voltage converter that converts the first voltage (e.g., 800V from the external power source 525) to a second voltage (e.g., 400V) that is less than the first voltage to power the powertrain/auxiliary components 520, for example, while the vehicle 100 is charging during a (fast) charging mode. The voltage converter 505 may be a direct current (DC) to direct current converter (DCDC).

Figure 6:
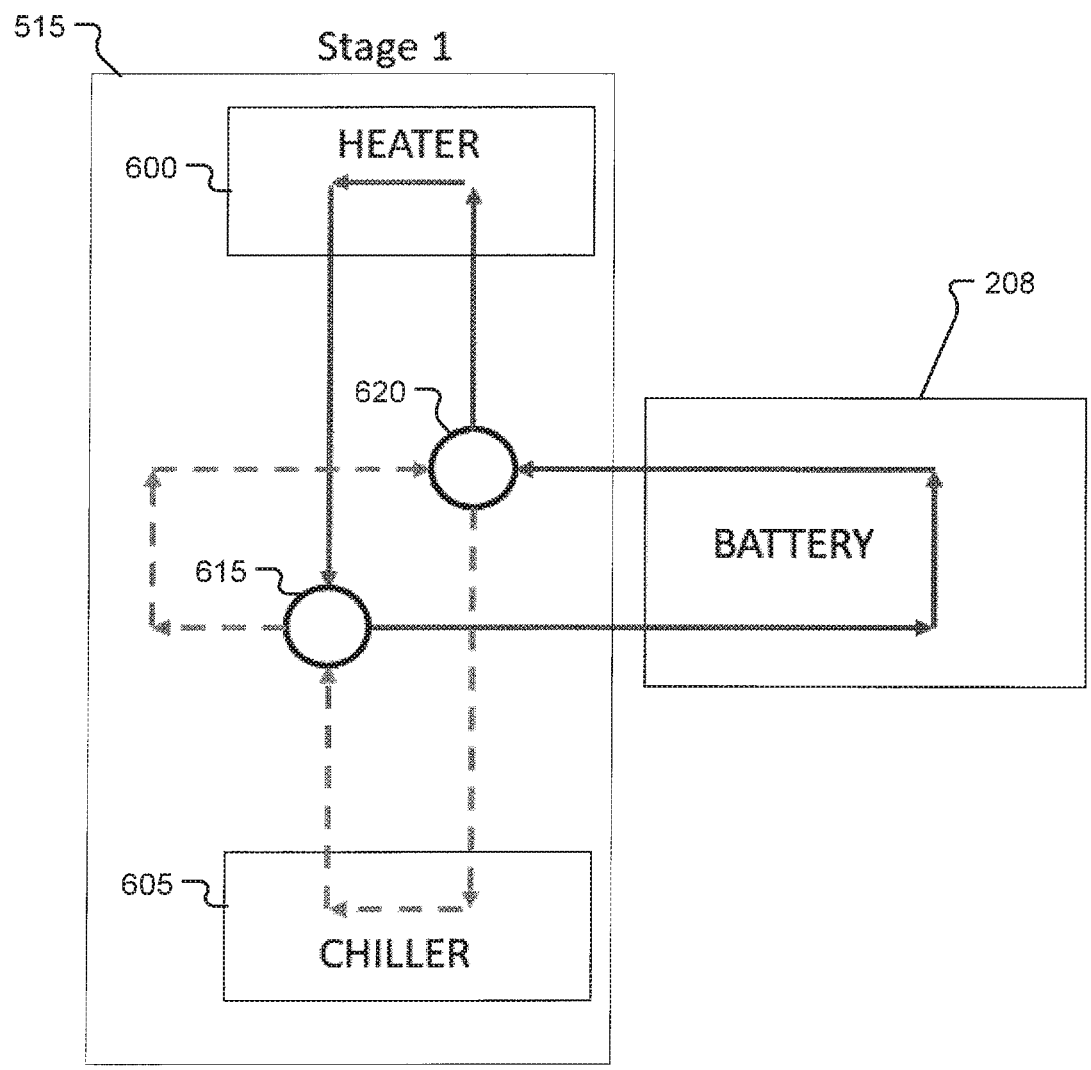
FIGS. 6-8 illustrate operation of the thermal control system 515 in a plurality of stages of a charging operation in accordance with at least one example embodiment.
Figure 7:
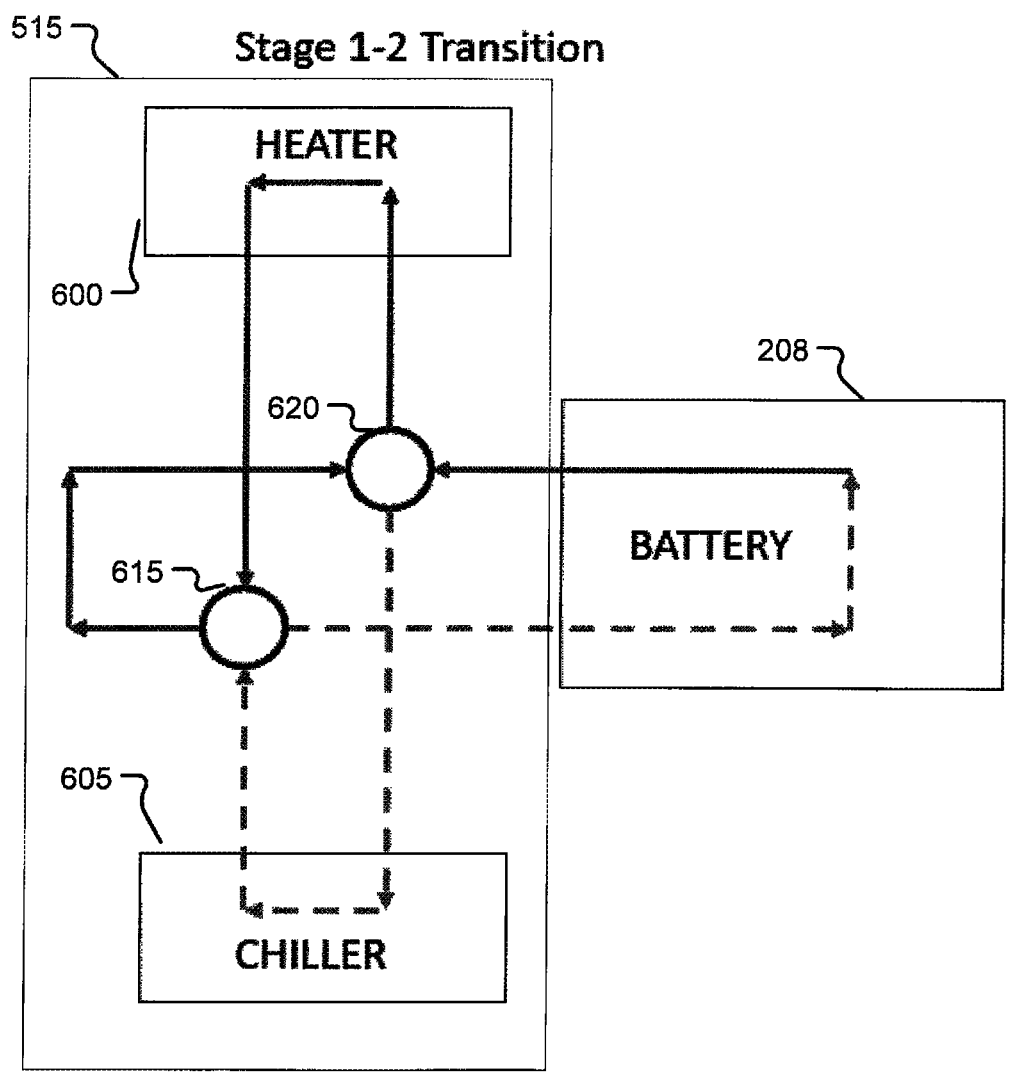
Figure 8:
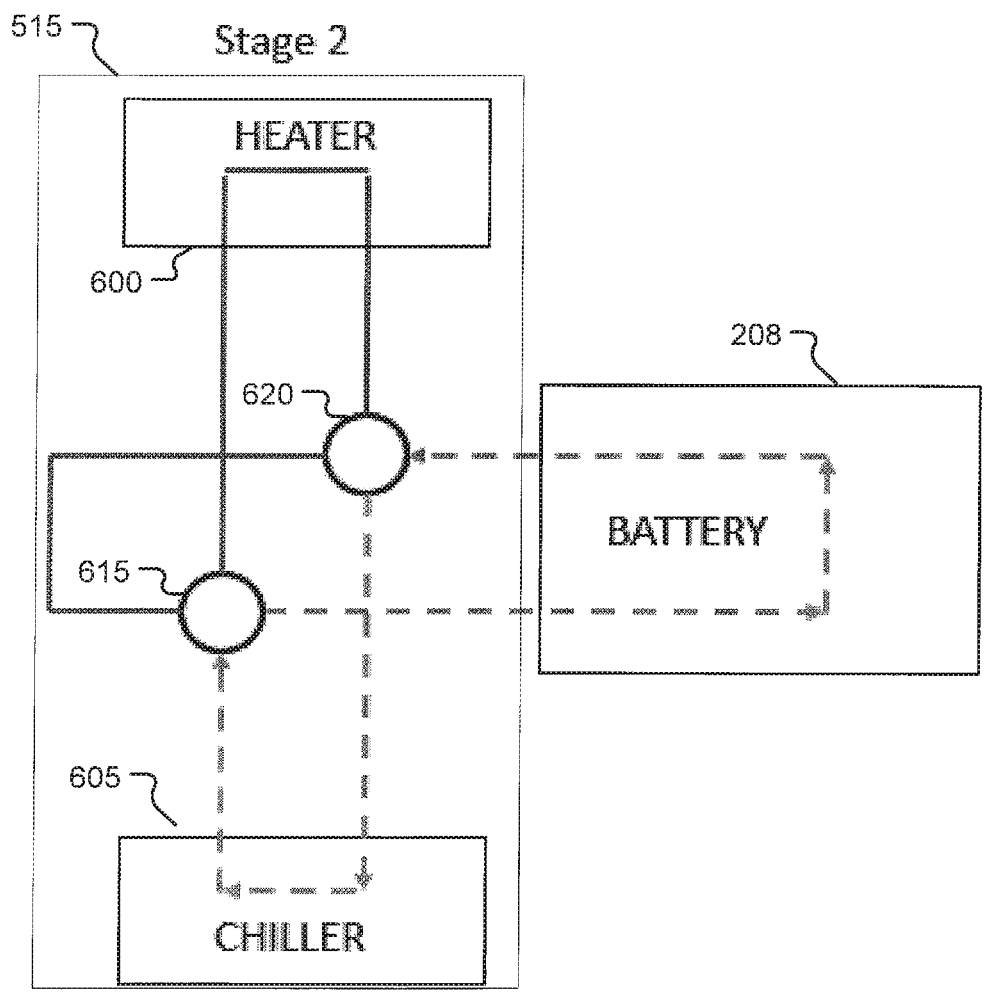

The controller 224 controls the thermal control system 515 to provide temperature control for various components of the vehicle 100, such as the battery 208. The thermal control system 515 may include any device capable of heating and/or cooling a thermal mass (e.g., a thermal management fluid) that is passed through all or part of the battery 208. Exemplary heating devices or elements include electric heating devices (e.g., radiant heaters, convection heaters, fan heaters, heat pumps, immersion heaters, direct electric heat exchangers, and electrode heaters), infrared heaters, microwave heaters, electromagnetic heaters, and other conduction, convection, and/or radiant heating devices. Exemplary cooling devices or elements include direct, indirect, or multi-stage evaporative cooler (which cools the thermal management fluid through water evaporation), vapor-compression cycle refrigeration cycle devices (which typically comprise a fluid refrigerant, a compressor that controls the flow of the refrigerant, a condenser coil located outside the device, an evaporator coil located inside the device, and an expansion device), acoustic cooling devices, magnetic cooling devices, pulse type cooling devices, Sterling cycle cooling devices, other cryocooling devices, thermoelectric cooling and thermionic cooling devices, vortex tube cooling devices, water cycle cooling devices, and other cooling devices. When used for cooling, the thermal control system 515 can include ethylene glycol or a derivative thereof to raise the boiling point of the fluid and/or lower the freezing point of the fluid. A heat exchanger can be used to transfer thermal energy from a heat exchange medium to or from the thermal management fluid. In any event, the heating element (or heater) 600 and/or the cooling element (or chiller) 605 may include one or more pumping mechanisms to cause the flow of the thermal mass. FIGS. 6-8 illustrate the thermal control system 515 and its operation in additional detail.

FIGS. 6-8 illustrate operation of the thermal control system 515 in a plurality of stages of a charging operation according to at least one example embodiment. In FIGS. 6-8, it should be understood that the thermal control system 515 is under control of the controller 224 during the charging operation. Further, the charging operation may encompass a time period that includes charging the battery 208 as well as time periods prior to (e.g., for pre-charge operations) and subsequent to (e.g., for post-charge operations) the actual charging of the energy storage device 208.

As shown in FIGS. 6-8, the thermal control system 515 includes a heating element (or heater) 600 and a cooling element (or chiller) 605, examples of which are described above with reference to FIG. 5. In FIGS. 6-8, thermal mass which is heated by the heating element 600 is illustrated with solid lines while thermal mass which is cooled by the cooling element 605 is illustrated with dashed lines. Further, the direction of flow of the thermal mass in FIGS. 6-8 is shown with arrows. FIGS. 6-8 also illustrate that the thermal control system 515 includes a first thermal control device 615 and a second thermal control device 620 to control the flow of thermal mass. Non-limiting examples of thermal control devices 615/620 include needle valves, ball valves, solenoid valves, butterfly valves, gate valves, fluid control valves, or any other valves capable of being controlled by the controller 224. According to at least one example embodiment, the thermal control devices 615 and 620 are three-way valves.

As shown, FIG. 6 illustrates a first stage (Stage 1) of operation, FIG. 7 illustrates a transition between the first stage and a second stage (Stage 2) of operation, and FIG. 8 illustrates the second stage of operation.

As noted above, the controller 224 may initiate a charging operation for the battery 208. With reference to FIGS. 6-8, the controller 224 controls at least one heating element 600 to heat a first volume of thermal mass, and controls at least one cooling element 605 to cool a second volume of the thermal mass.

FIG. 6 shows that the controller 224 controls, during the first stage of the charging operation, the thermal control system 515 to direct the first volume of the thermal mass along a first flow path (shown by the solid lines) to heat the battery 208 to a first desired temperature. As shown in FIG. 6, the controller 224 controls, during the first stage, the thermal control system 515 to direct the second volume of the thermal mass along a (third) flow path (shown by the dashed lines) that is thermally isolated from the battery 208 while the battery 208 heats to the first desired temperature. According to at least one example embodiment, the controller 224 controls the thermal control system 515 to direct the second volume of the thermal mass along the third flow path throughout the first stage.

According to at least one example embodiment, the battery 208 is a lithium-ion battery. In this case, the first desired temperature may be a temperature associated with avoiding lithium plating for the lithium-ion battery. Lithium plating is the formation of metallic lithium around the anode of lithium-ion batteries during charging, which can damage the battery and may eventually lead to malfunction of the battery. Embodiments of the present disclosure provided can avoid or mitigate lithium plating by heating the battery while being charged to a particular temperature known to avoid lithium plating, thereby extending the life of the battery. The first desired temperature may be an average temperature over the entire battery 208, an average temperature of selected cells of the battery 208, a temperature of a single cell within the battery 208, etc. The particular method and devices used to measure temperature of the battery 208 may be design parameters selected based on empirical evidence and/or preference.

FIG. 7 illustrates a transition between Stages 1 and 2. As shown in FIG. 7, the controller 224 controls the thermal control system 515 such that the heated thermal mass is pumped/pushed out of the flow path that includes battery 208 and the cooled thermal mass is pumped into the flow path that includes battery 208.

FIG. 8 shows the second stage for the thermal control system 515. In FIG. 8, the heating element 600 and/or its pumping mechanism may be disabled (as shown by the solid lines with no arrows) by the controller 224 because the heated thermal mass is no longer useful for the given charging operation.

It should be appreciated that FIGS. 7 and 8 show that the controller 224 controls, during the second stage of the charging operation, the thermal control system 515 to direct the second volume of the thermal mass along a second flow path (shown by the dashed lines) to cool the battery 208 from the first desired temperature toward a second desired temperature. Here, it should be understood that the second flow path includes at least part of the first flow path.

With reference to FIG. 8, the controller 224 detects, in the second stage, that charging of the battery 208 is complete. The controller 224 controls, during the second stage, the thermal control system 515 to direct the second volume of the thermal mass along the second flow path until the battery 208 reaches the second desired temperature. That is, although the actual charging of the battery 208 may be complete, the controller 224 controls the thermal control system 515 to continue cooling the battery 208 until the second desired temperature is reached. In at least one example embodiment, the controller 224 provides a notification (e.g., an audio and/or visual notification to the driver) that the charging operation is complete when the battery 208 reaches the second desired temperature. The notification may indicate that the vehicle 100 is ready to drive.

According to at least one example embodiment, the second desired temperature may be a temperature at which the battery 208 is considered safe to begin drawing charge from in order to supply power to components of the vehicle 100. The second desired temperature may be measured in the same or similar manner as the first desired temperature. The second desired temperature may be a design parameter selected based on empirical evidence and/or preference.

As shown in FIGS. 6-8, each of the first thermal control device 615 and the second thermal control device 620 are in the first, second, and third flow paths. That is, each thermal control device 615/620 are in flow paths that include both cooled thermal mass and heated thermal mass. Further, it should be understood that the first stage may correspond to a first time period in which the battery 208 is charging. The second stage may also correspond to a second time period in which the battery 208 is charging. The second time period may be later in the charging operation than the first time period.

Figure 9:
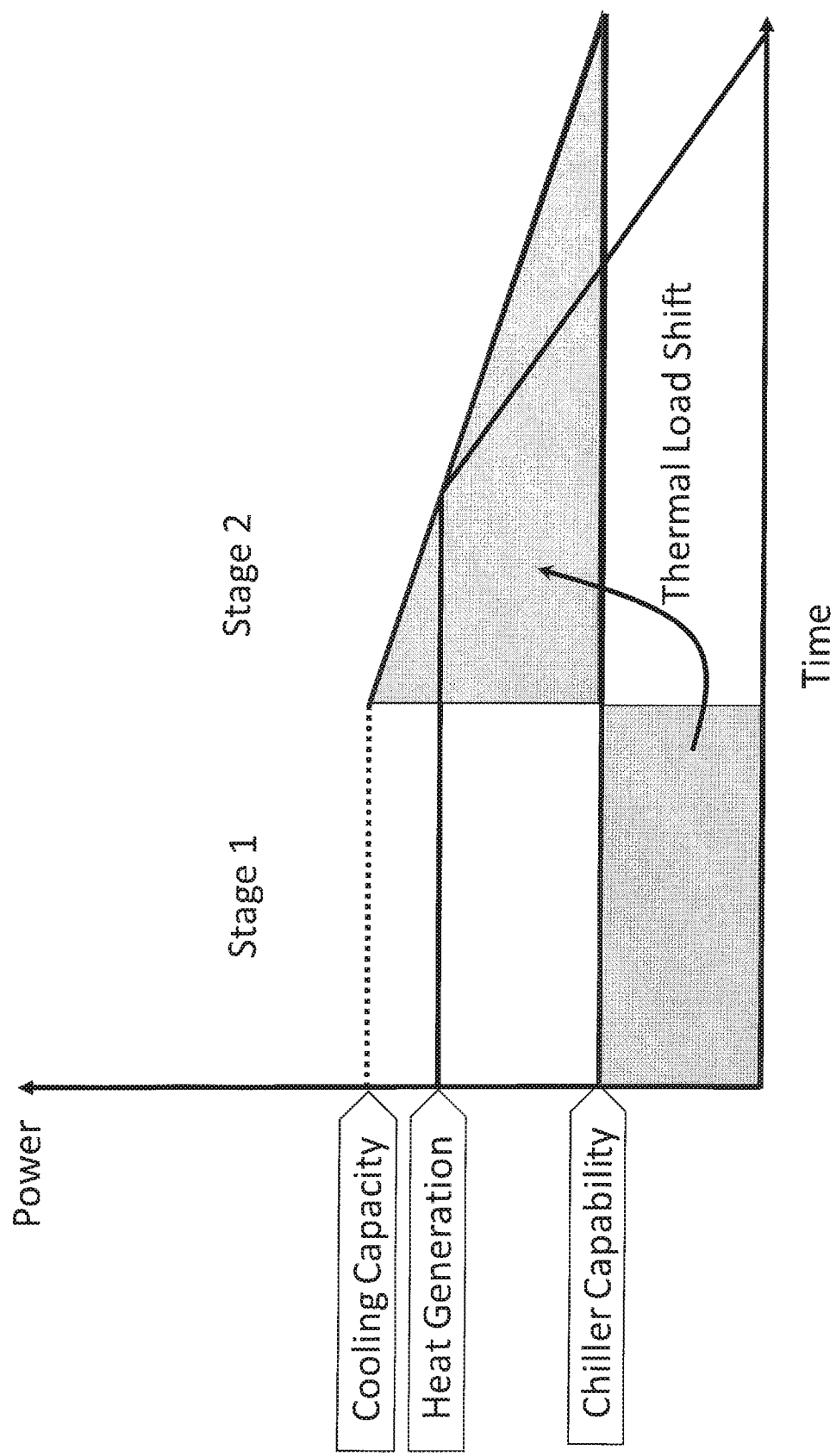
FIG. 9 is a graphical illustration of the stages from FIGS. 6-8 in accordance with at least one example embodiment.

FIG. 9 is a graphical illustration of the stages from FIGS. 6-8 according to at least one example embodiment. In more detail, FIG. 9 shows how the thermal control system 515 achieves a thermal load shift during upon transition from Stage 1 to Stage 2 of the charging operation. Here, the thermal load shift refers to operating the cooling element 605 while charging and heating the battery 208 during Stage 1 to build up a volume of cool thermal mass that is then used in Stage 2 to quickly cool the battery 208 for the remainder of the charging operation. Operating the cooling element 605 in this manner may improve charging rates for the battery 208 as well as extend the life of the battery 208.

Figure 10:
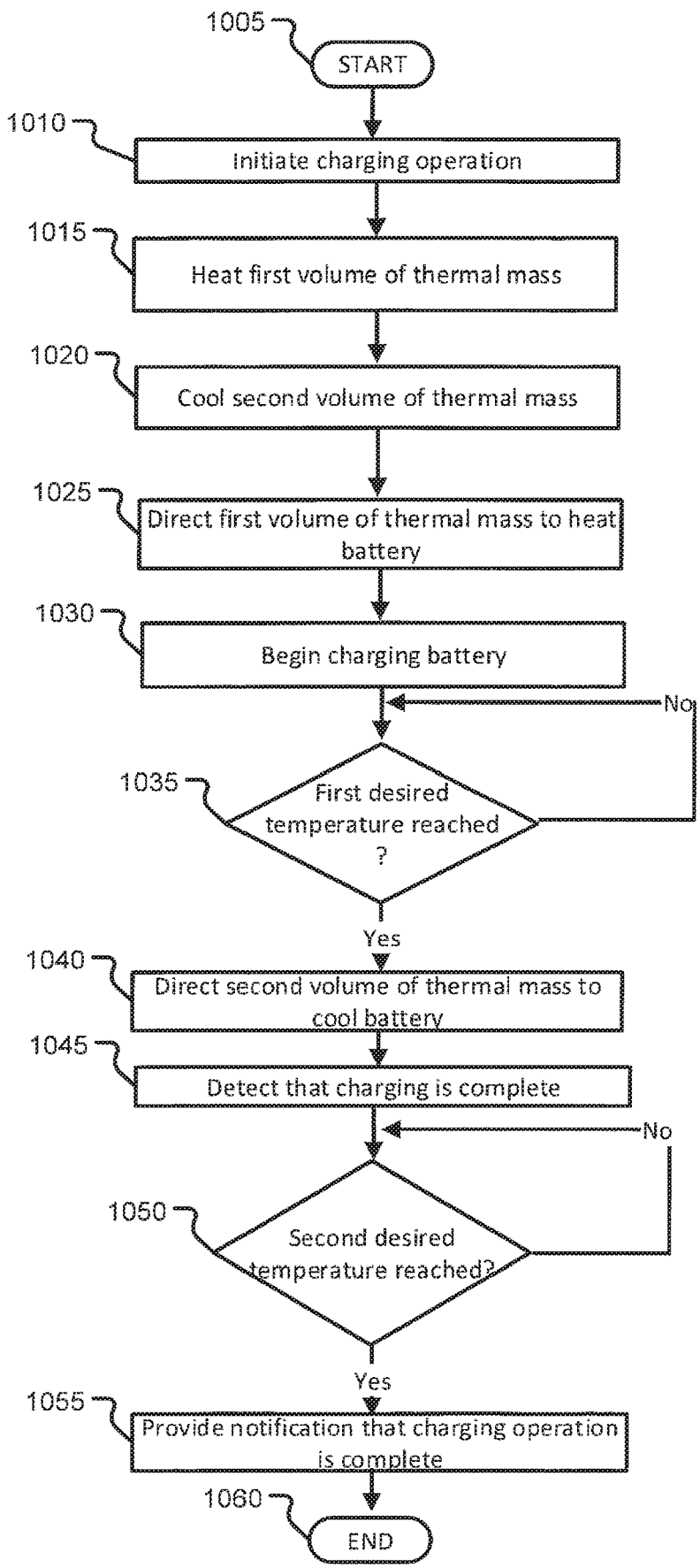
FIG. 10 is a flow diagram illustrating example operations of the system(s) in FIGS. 1-9 in accordance with at least one example embodiment.

FIG. 10 is a flow diagram illustrating example operations of the system(s) in FIGS. 1-9 according to at least one example embodiment.

While a general order for the steps of the method 1000 is shown in FIG. 10, the method 1000 can include more or fewer steps or can arrange the order of the steps differently than those shown in FIG. 10. Generally, the method 1000 starts at operation 1005 and ends at operation 1060. In at least one example embodiment, the method 1000 can be executed as a set of computer-executable instructions executed by the controller 224 and/or the control system (that includes one or more processors) 448 and encoded or stored on a computer readable medium (e.g., a memory of the controller 224 and/or control data storage 468). Alternatively, the operations discussed with respect to FIG. 10 may be implemented by hardware, such as an ASIC, and/or other various elements of the system(s) in FIGS. 1-8. Hereinafter, the method 1000 shall be explained with reference to the systems, components, assemblies, devices, user interfaces, environments, software, etc. described in conjunction with FIGS. 1-9.

In operation 1010, the method 1000 includes initiating a charging operation for the battery 208. The charging operation may be initiated automatically by the vehicle 100, for example, when the vehicle 100 detects that the battery 208 should be charged in the near future (by monitoring a voltage level of the battery 208). Additionally or alternatively, the charging operation may be initiated by an operator of the vehicle 100, for example, when the operator desires to charge the vehicle 100.

In operation 1015, the method 1000 includes heating a first volume of thermal mass (e.g., shown by the solid lines in FIG. 6). In operation 1020, the method 1000 includes cooling a second volume of the thermal mass (e.g., shown by the dashed lines in FIG. 6). According to at least one example embodiment, the heating the first volume of the thermal mass and the cooling the second volume of the thermal mass in operations 1020 and 1025 begin in response to initiating the charging operation (from operation 1010) and occur before beginning to charge the battery 208. In other words, it should be understood that the vehicle 100 may anticipate the need for the battery 208 to be recharged by monitoring a level of the battery 208 during operation of the vehicle 100. For example, upon the battery 208 being drained beyond a desired threshold level (e.g., voltage threshold), the method 1000 may initiate the charging operation and begin heating and cooling the thermal mass in anticipation that the battery 208 will be charged in the near future (e.g., within a desired threshold amount of time). Then, the heated and cooled thermal masses are ready for use during actual charging of the battery 208, thereby reducing the amount of time for the charging operation. Here, it should be understood that the heating and cooling operations may be initiated simultaneously or at different times depending on an estimated amount of time to a charging station and/or an estimated amount of time needed to heat or cool the thermal mass before actual charging of the battery 208 is anticipated to begin.

In operation 1025, the method 1000 includes directing, during a first stage of the charging operation, the first volume of the thermal mass along a first flow path (e.g., shown by the solid lines in FIG. 6) to heat the battery 208 to a first desired temperature. As noted above in the discussion of FIGS. 5-8, the first desired temperature may be a temperature at which the battery 208 can avoid lithium plating during actual charging.

In operation 1030, the method 1000 includes directing, during a second stage of the charging operation, the second volume of the thermal mass along a second flow path (e.g., shown by the dashed lines in FIGS. 7 and 8) to cool the battery 208 from the first desired temperature toward a second desired temperature. As noted above, the second desired temperature may be a temperature at which the battery 208 is considered safe to draw charge from after charging.

Although not explicitly shown, it should be understood that operation 1025 may also include directing, during the first stage of the charging operation, the second volume of the thermal mass along a third flow path (e.g., shown by the dashed lines in FIG. 6) that is isolated from the first flow path while the battery 208 heats to the first desired temperature.

In operation 1035, the method 1000 determines whether the battery 208 has reached the first desired temperature. If not, the method 1000 continues to monitor the temperature of the battery 208. If so, the method 1000 proceeds to operation 140. As noted above in the discussion of FIGS. 5-8, the temperature of the battery 208 may be monitored in a variety of ways. For example, the temperature of the may be measured directly (e.g., as an average temperature of selected individual cells of the battery 208 or a temperature of a single cell of the battery 208) or indirectly (e.g., as a temperature of the first volume of thermal mass known to heat the battery 208 to the first desired temperature).

In operation 1040, the method 1000 includes directing the second volume of the thermal mass along the second flow path until the battery 208 reaches the second desired temperature (e.g., see the dashed lines in FIG. 8). Directing the second volume of the thermal mass in operation 1040 may include the second volume of the thermal mass pushing the (hotter) first volume of the thermal mass out of the flow path that includes the battery 208. This allows for minimal mixing of the hotter and cooler volumes of the thermal mass, which improves cooling capability. For example, as shown in FIGS. 7 and 8, the first (hotter) volume of the thermal mass is pushed out of the flow path of the battery 208 and then isolated from the second (cooler) volume of the thermal mass by the thermal control devices 615/620. Additionally or alternatively, it should be further understood that a pump of the heating element 600 may pump (or pull) the hotter first volume of the thermal mass as the second volume of the thermal mass takes its place. Although not explicitly shown, it should be understood that operation 1040 may be carried out immediately after the battery 208 reaches the first desired temperature or at some desired time after the battery 208 reaches the first desired temperature.

In operation 1045, the method 1000 includes detecting, in the second stage, that charging of the battery 208 is complete. The method 1000 may detect that charging the battery 208 is complete in various manners, including but not limited to when the battery 208 reaches a desired voltage, when a threshold amount of time is reached from beginning to charge the battery 208, when an operator of the vehicle 100 instructs that charging should be stopped, etc.

In operation 1050, the method 1000 provides a notification that the charging operation is complete when the battery 208 reaches the second desired temperature. Here, the notification may be in the form of an audio and/or visual notification to an operator of the vehicle 100 (e.g., by way of an email, SMS message, a display and/or sound in the vehicle 100, etc.). The notification serves as an indication that the battery 208 has cooled to a safe operating temperature such that the vehicle 100 is now ready to operate normally.

In view of the above, it should be understood that example embodiments are directed to a system 500 for a vehicle (e.g., an electric vehicle). The system 500 may include at least one heating element 600 to heat a first volume of thermal mass, and at least one cooling element 605 to cool a second volume of the thermal mass. The system 500 may include a thermal control system 515 to control a flow of the thermal mass, and at least one energy storage device 208 to supply power to the vehicle 100. The system 500 also includes a controller 224 to initiate a charging operation for the at least one energy storage device 208, control the at least one heating element 600 to heat a first volume of the thermal mass, control the thermal control system 515 to direct the first volume of the thermal mass along a first flow path to heat the at least one energy storage device 208 to a first desired temperature while charging the at least one energy storage device 208, control the at least one cooling element 605 to cool a second volume of the thermal mass, and control the thermal control system 515 to direct the second volume of the thermal mass along a second flow path to cool the at least one energy storage device 208 from the first desired temperature toward a second desired temperature.

According to at least one example embodiment, controller 224 controls the at least one heating element 600 to begin heating the first volume of the thermal mass and controls the at least one cooling element 605 to begin cooling the second volume of the thermal mass in response to initiating the charging operation and before beginning to charge the at least one energy storage device 208. Further, the controller 224 controls the thermal control system 515 to direct the second volume of the thermal mass along a third flow path that is isolated from the first flow path while the at least one energy storage device 208 heats to the first desired temperature. The controller 224 may detect that charging of the at least one energy storage device 208 is complete, control the thermal control system 515 to direct the second volume of the thermal mass along the second flow path until the at least one energy storage device 208 reaches the second desired temperature, and then provide a notification that the charging operation is complete when the at least one energy storage device 208 reaches the second desired temperature. In at least one example embodiment, the at least one energy storage device 208 is a lithium-ion battery, and the first desired temperature is a temperature associated with avoiding lithium plating for the lithium-ion battery.

In view of the above, it should be appreciated that example embodiments provide methods, devices, and/or systems that may increase battery life, increase the fast charge rate by heating the battery cells to get them out of lithium plating, decrease charge time by allowing higher charge rates sooner, and/or allow for downsizing compressor/chiller components by load shifting a thermal mass. It should be understood that example embodiments may provide other improvements over existing technology not specifically named herein, but readily recognizable by one of ordinary skill in the art.

Embodiments of the present disclosure include a device for charging an energy storage device, the device comprising a controller to initiate a charging operation for the energy storage device, control, during a first stage of the charging operation, a thermal control system to direct a first volume of the thermal mass along a first flow path to heat the energy storage device to a first desired temperature, and control, during a second stage of the charging operation, the thermal control system to direct a second volume of the thermal mass along a second flow path to cool the energy storage device from the first desired temperature toward a second desired temperature.

Aspects of the present disclosure include that the first stage corresponds to a first time period in which the energy storage device is charging.

Aspects of the present disclosure include that the second stage corresponds to a second time period in which the energy storage device is charging. The first and second time periods are discrete from one another.

Aspects of the present disclosure include that the controller controls, during the first stage, the thermal control system to direct the second volume of the thermal mass along a third flow path that is thermally isolated from the energy storage device while the energy storage device heats to the first desired temperature.

Aspects of the present disclosure include that the controller controls the thermal control system to direct the second volume of the thermal mass along the third flow path throughout the first stage.

Aspects of the present disclosure include that the controller detects, in the second stage, that charging of the energy storage device is complete, and controls, during the second stage, the thermal control system to direct the second volume of the thermal mass along the second flow path until the energy storage device reaches the second desired temperature.

Aspects of the present disclosure include that the controller provides a notification that the charging operation is complete when the energy storage device reaches the second desired temperature.

Aspects of the present disclosure include that the thermal control system includes a first thermal control device and a second thermal control device, each of the first thermal control device and the second thermal control device being in the first and second flow paths.

Aspects of the present disclosure include that the first thermal control device and the second thermal control device are three-way valves.

Aspects of the present disclosure include that the energy storage device includes a battery of an electric vehicle, wherein the at least one heating element includes one or more components of the electric vehicle that emit heat, and wherein the at least one cooling element is a compressor of the electric vehicle.

Embodiments of the present disclosure include a method for charging an energy storage device, the method comprising initiating a charging operation for the energy storage device, directing, during a first stage of the charging operation, a first volume of the thermal mass along a first flow path to heat the energy storage device to a first desired temperature, and directing, during a second stage of the charging operation, a second volume of the thermal mass along a second flow path to cool the energy storage device from the first desired temperature toward a second desired temperature.

Aspects of the present disclosure include heating the first volume of thermal mass, and cooling the second volume of the thermal mass, wherein the heating the first volume of the thermal mass and the cooling the second volume of the thermal mass begin in response to initiating the charging operation and occur before beginning to charge the energy storage device.

Aspects of the present disclosure include directing the second volume of the thermal mass along a third flow path that is isolated from the first flow path while the energy storage device heats to the first desired temperature.

Aspects of the present disclosure include that the second flow path includes at least part of the first flow path.

Aspects of the present disclosure include that the energy storage device is a lithium-ion battery, and wherein the first desired temperature is a temperature associated with avoiding lithium plating for the lithium-ion battery.

Embodiments of the present disclosure include a system for a vehicle. The system includes at least one heating element, at least one cooling element, a thermal control system to control a flow of a thermal mass, at least one energy storage device to supply power to the vehicle, and a controller. The controller initiates a charging operation for the at least one energy storage device, controls the at least one heating element to heat a first volume of the thermal mass, controls the thermal control system to direct the first volume of the thermal mass along a first flow path to heat the at least one energy storage device to a first desired temperature while charging the at least one energy storage device, controls the at least one cooling element to cool a second volume of the thermal mass, and controls the thermal control system to direct the second volume of the thermal mass along a second flow path to cool the at least one energy storage device from the first desired temperature toward a second desired temperature.

Aspects of the present disclosure include that the controller controls the at least one heating element to begin heating the first volume of the thermal mass and controls the at least one cooling element to begin cooling the second volume of the thermal mass in response to initiating the charging operation and before beginning to charge the at least one energy storage device.

Aspects of the present disclosure include that the controller controls the thermal control system to direct the second volume of the thermal mass along a third flow path that is isolated from the first flow path while the at least one energy storage device heats to the first desired temperature.

Aspects of the present disclosure include that the controller detects that charging of the at least one energy storage device is complete, controls the thermal control system to direct the second volume of the thermal mass along the second flow path until the at least one energy storage device reaches the second desired temperature, and provides a notification that the charging operation is complete when the at least one energy storage device reaches the second desired temperature.

Aspects of the present disclosure include that the at least one energy storage device is a lithium-ion battery, and the first desired temperature is a temperature associated with avoiding lithium plating for the lithium-ion battery.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A device for charging an energy storage device, the device comprising:
   a controller to:
     initiate a charging operation for the energy storage device;
     control, during a first stage of the charging operation, a thermal control system to direct a first volume of a thermal mass along a first flow path to heat the energy storage device to a first desired temperature;
     control, during the first stage of the charging operation, at least one cooling element to cool a second volume of the thermal mass to a second desired temperature while the first volume of the thermal mass heats the energy storage device; and
     control, during a second stage of the charging operation, the thermal control system to direct the second volume of the thermal mass that has been cooled to the second desired temperature along a second flow path to cool the energy storage device from the first desired temperature toward the second desired temperature, wherein the controller controls, during the first stage of the charging operation, the thermal control system to direct the second volume of the thermal mass through the at least one cooling element along a third flow path that is thermally isolated from the energy storage device so that the at least one cooling element cools the second volume of thermal mass to the second desired temperature while the energy storage device heats to the first desired temperature, wherein the thermal control system includes a first thermal control device and a second thermal control device, and
wherein the controller controls each of the first thermal control device and the second thermal control device so that the first volume of the thermal mass and the second volume of the thermal mass pass through both of the first thermal control device and the second thermal control device during the both of the first stage and the second stage of the charging operation.

2. The device of claim 1, wherein, during a transition between the first stage and the second stage, the second volume of the thermal mass mixes with the first volume of the thermal mass, and wherein the first stage corresponds to a first time period in which the energy storage device is charging.

3. The device of claim 2, wherein the second stage corresponds to a second time period in which the energy storage device is charging, and wherein the first and second time periods are discrete from one another.

4. The device of claim 1, wherein the controller controls, during the second stage, the thermal control system to direct the second volume of the thermal mass along the second flow path until the energy storage device reaches the second desired temperature.

5. The device of claim 1, wherein the controller controls the thermal control system to direct the second volume of the thermal mass along the third flow path throughout the first stage.

6. The device of claim 1, wherein the controller:
detects, in the second stage, that charging of the energy storage device is completed; and
controls, during the second stage, the thermal control system to direct the second volume of the thermal mass along the second flow path until the energy storage device reaches the second desired temperature.

7. The device of claim 6, wherein the controller provides a notification that the charging operation is completed in response to determining that the energy storage device reaches the second desired temperature.

8. The device of claim 4, wherein each of the first thermal control device and the second thermal control device are in the third flow path.

9. The device of claim 1, wherein the first thermal control device and the second thermal control device are three-way valves.

10. The device of claim 1, wherein the energy storage device includes a battery of an electric vehicle, wherein at least one heating element includes one or more components of the electric vehicle that emit heat, and wherein the at least one cooling element is a compressor of the electric vehicle.

11. A method for charging an energy storage device, the method comprising:
initiating a charging operation for the energy storage device;
directing, during a first stage of the charging operation, a first volume of a thermal mass along a first flow path to heat the energy storage device to a first desired temperature;
cooling, during the first stage of the charging operation, a second volume of the thermal mass to a second desired temperature while the first volume of the thermal mass heats the energy storage device; and
directing, during a second stage of the charging operation, the second volume of the thermal mass that has been cooled to the second desired temperature along a second flow path to cool the energy storage device from the first desired temperature towards the second desired temperature, wherein, during the first stage of the charging operation, the second volume of the thermal mass is directed through a cooling device along a third flow path that is thermally isolated from the energy storage device so that the cooling device cools the second volume of the thermal mass to the second desired temperature while the energy storage device heats to the first desired temperature,
wherein the second flow path includes at least part of the first flow path.

12. The method of claim 11, further comprising:
heating the first volume of the thermal mass, wherein the heating the first volume of the thermal mass and the cooling the second volume of the thermal mass begin in response to initiating the charging operation and begin to occur before beginning to charge the energy storage device.

13. The method of claim 11, further comprising:
directing the second volume of the thermal mass along the third flow path throughout the first stage.

14. The method of claim 13, wherein the third flow path includes at least part of the second flow path.

15. The method of claim 11, wherein the energy storage device is a lithium-ion battery, and wherein the first desired temperature is a temperature associated with avoiding lithium plating for the lithium-ion battery.

16. A system for a vehicle, comprising:
at least one heating element;
at least one cooling element;
a thermal control system to control a flow of a thermal mass;
at least one energy storage device to supply power to the vehicle; and
a controller to:
initiate a charging operation for the at least one energy storage device;
control the at least one heating element to heat a first volume of the thermal mass;
control the thermal control system to direct the first volume of the thermal mass along a first flow path to heat the at least one energy storage device to a first desired temperature while charging the at least one energy storage device;
control, during a first stage of the charging operation, the at least one cooling element to cool a second volume of the thermal mass to a second desired temperature while the at least one energy storage device heats to the first desired temperature; and
control the thermal control system to direct the second volume of the thermal mass that has been cooled to the second desired temperature along a second flow path to cool the at least one energy storage device from the first desired temperature toward a second desired temperature, wherein the controller controls, during the first stage of the charging operation, the thermal control system to direct the second volume of the thermal mass along a third flow path that is thermally isolated from the energy storage device so that the at least one cooling element cools the second volume of the thermal mass to the second desired temperature while the energy storage device heats to the first desired temperature,
wherein the second flow path includes at least part of the first flow path.

17. The system of claim 16, wherein the controller controls the at least one heating element to begin heating the first volume of the thermal mass and controls the at least one cooling element to begin cooling the second volume of the thermal mass in response to initiating the charging operation and before beginning to charge the at least one energy storage device.

18. The system of claim 17, wherein the controller controls the thermal control system to direct the second volume of the thermal mass along the third flow path throughout the first stage.

19. The system of claim 17, wherein the controller:
detects that charging of the at least one energy storage device is complete;
controls the thermal control system to direct the second volume of the thermal mass along the second flow path until the at least one energy storage device reaches the second desired temperature; and
provides a notification that the charging operation is completed in response to determining that the at least one energy storage device reaches the second desired temperature.

20. The system of claim 17, wherein the at least one energy storage device is a lithium-ion battery, and wherein the first desired temperature is a temperature associated with avoiding lithium plating for the lithium-ion battery.

* * * * *

UNITED STATES PATENT AND TRADEMARK OFFICE
CERTIFICATE OF CORRECTION

PATENT NO. : 11,117,477 B2
APPLICATION NO. : 15/940638
DATED : September 14, 2021
INVENTOR(S) : Alexander J. Smith et al.

It is certified that error appears in the above-identified patent and that said Letters Patent is hereby corrected as shown below:

In the Claims

Claim 1, Column 25, Line 9, delete "during the both" and insert --during both-- therein.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*